United States Patent
Radhakrishnan et al.

(10) Patent No.: US 9,665,491 B2
(45) Date of Patent: May 30, 2017

(54) ADAPTIVE MECHANISM TO TUNE THE DEGREE OF PRE-FETCHES STREAMS

(71) Applicants: Arun Radhakrishnan, Austin, TX (US); Karthik Sundaram, Austin, TX (US)

(72) Inventors: Arun Radhakrishnan, Austin, TX (US); Karthik Sundaram, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 50 days.

(21) Appl. No.: 14/730,217

(22) Filed: Jun. 3, 2015

(65) Prior Publication Data

US 2016/0019155 A1 Jan. 21, 2016

Related U.S. Application Data

(60) Provisional application No. 62/026,004, filed on Jul. 17, 2014.

(51) Int. Cl.
*G06F 12/08* (2016.01)
*G06F 12/0862* (2016.01)

(52) U.S. Cl.
CPC .. *G06F 12/0862* (2013.01); *G06F 2212/6024* (2013.01)

(58) Field of Classification Search
CPC ............... G06F 12/0862; G06F 9/3802; G06F 9/30047; G06F 9/3814; G06F 9/383; G06F 2212/602; G06F 2212/1024; G06F 2212/6024; G06F 2212/6026; G06F 2212/6028

See application file for complete search history.

(56) References Cited

U.S. PATENT DOCUMENTS

| | | | | |
|---|---|---|---|---|
| 7,836,259 | B1* | 11/2010 | Filippo | G06F 12/0862 711/137 |
| 2006/0248280 | A1* | 11/2006 | Al-Sukhni | G06F 9/383 711/137 |
| 2010/0268893 | A1* | 10/2010 | Luttrell | G06F 12/0862 711/137 |
| 2014/0059299 | A1* | 2/2014 | Durbhakula | G06F 12/0862 711/137 |
| 2014/0359221 | A1* | 12/2014 | Kalamatianos | G06F 12/0811 711/122 |
| 2015/0026414 | A1* | 1/2015 | Kalamatianos | G06F 12/0862 711/137 |

* cited by examiner

*Primary Examiner* — Michael Krofcheck
(74) *Attorney, Agent, or Firm* — Renaissance IP Law Group LLP

(57) ABSTRACT

According to one general aspect, a method may include monitoring a plurality of pre-fetch cache requests associated with a data stream. The method may also include evaluating an accuracy of the pre-fetch cache requests. The method may further include, based at least in part upon the accuracy of the pre-fetch cache requests, adjusting a maximum amount of data that is allowably pre-fetched in excess of a data stream's current actual demand for data.

17 Claims, 6 Drawing Sheets

502 Monitoring a plurality of pre-fetch cache requests associated with a respective data stream

504 Dynamically evaluating an accuracy of the pre-fetch cache requests

506 Based at least in part upon the accuracy of the pre-fetch cache requests, dynamically adjusting a maximum amount of data that is allowably pre-fetched in excess of a respective data stream's current actual demand for data

ADAPTIVE MECHANISM TO TUNE THE DEGREE OF PRE-FETCHES STREAMS

CROSS-REFERENCE TO RELATED APPLICATION

This application claims priority under 35 U.S.C. §119 to Provisional Patent Application Ser. No. 62/026,004, entitled "AN ADAPTIVE MECHANISM TO TUNE THE DEGREE OF PRE-FETCHES STREAMS" filed on Jul. 17, 2014. The subject matter of this earlier filed application is hereby incorporated by reference.

TECHNICAL FIELD

This description relates to storing data, and more specifically to cache management.

BACKGROUND

Generally, computers and the programs executed by them have a voracious appetite for unlimited amounts of fast memory. Unfortunately, memory (especially fast memory) is generally expensive both in terms of cost and die area. The traditional solution to the desire for unlimited, fast memory is a memory hierarchy or system of tiers or levels of memories. In general, the tiered memory system includes a plurality of levels of memories, each level slower but larger than the previous tier.

A typical computer memory hierarchy may include three levels. The fastest and smallest memory (often called a "Level 1 (L1) cache") is closest to the processor and includes static random access memory (RAM and SRAM). The next tier or level is often called a Level 2 (L2) cache, and is larger but slower than the L1 cache. The third level is the main memory and generally includes dynamic RAM (DRAM), often inserted into memory modules. However, other systems may have more or less memory tiers. Also, in some systems the processor registers and the permanent or semi-permanent storage devices (e.g., hard drives, solid state drives, etc.) may be considered part of the memory system.

The memory system generally makes use of a principle of inclusiveness, wherein the slowest but largest tier (e.g., main memory, etc.) includes all of the data available. The second tier (e.g., the L2 cache, etc.) includes a sub-set of that data, and the next tier from that (e.g., the L1 cache, etc.) includes a second sub-set of the second tier's subset of data, and so on. As such, all data included in a faster tier is also included by slower tier.

Generally, the caches decide what sub-set of data to include based upon the principle of locality (e.g., temporal locality, spatial locality, etc.). It is assumed that a program will wish to access data that it has either recently accessed or is next to the data it has recently accessed. For example, if a movie player program is accessing data, it is likely that the movie player will want to access the next few seconds of the movie, and so on.

However, occasionally a program will request a piece of data that is not available in the fastest cache (e.g., the L1 cache, etc.). That is generally known as a "cache miss" and causes the fastest cache to request the data from the next memory tier (e.g., the L2 cache). This is costly to processor performance as a delay is incurred in determining that a cache miss has occurred, retrieving the data by the L1 cache, and providing it to the processor. Occasionally, the next tier of memory (e.g., the L2 cache, etc.) may not include the requested data and must request it from the next tier (e.g., main memory, etc.). This generally costs further delays.

SUMMARY

According to one general aspect, a method may include monitoring a plurality of pre-fetch cache requests associated with a data stream. The method may also include evaluating an accuracy of the pre-fetch cache requests. The method may further include, based at least in part upon the accuracy of the pre-fetch cache requests, adjusting a maximum amount of data that is allowably pre-fetched in excess of a data stream's current actual demand for data.

According to another general aspect, an apparatus may include a pre-fetch confirmer and a memory. The pre-fetch confirmer may be configured to: monitor a plurality of pre-fetch cache requests associated with a data stream, evaluate an accuracy of the pre-fetch cache requests, and, based at least in part upon the accuracy of the pre-fetch cache requests, adjust a maximum amount of data that is allowably pre-fetched in excess of a data stream's current actual demand for data. The memory may be configured to: store a first data structure indicating the accuracy of the plurality of pre-fetch cache requests, and store a second data structure indicating the maximum amount of data that is allowed to be y pre-fetched in excess of a data stream's current actual demand for data.

According to another general aspect, a pre-fetch unit may include a pattern table, an adaptive pre-fetch table, and a launch queue. The pattern table may include a pattern data structure associated with a data stream. The adaptive pre-fetch table may include an adaptive pre-fetch data structure associated with the data stream and indicating a maximum amount of data that is allowably pre-fetched in excess of a data stream's current actual demand for data. The launch queue may be configured to issue a plurality of pre-fetch cache requests to pre-fetch data for the data stream. The pre-fetch unit may be configured to: evaluate an accuracy of the pre-fetch cache requests, and, based at least in part upon the accuracy of the pre-fetch cache requests, adjust the maximum amount of data that is allowably pre-fetched in excess of a data stream's current actual demand for data.

The details of one or more implementations are set forth in the accompanying drawings and the description below. Other features will be apparent from the description and drawings, and from the claims.

A system and/or method for storing data, and more specifically to cache management, substantially as shown in and/or described in connection with at least one of the figures, as set forth more completely in the claims.

BRIEF DESCRIPTION OF THE DRAWINGS

FIG. 5 is a flowchart of an example embodiment of a technique in accordance with the disclosed subject matter.

Like reference symbols in the various drawings indicate like elements.

DETAILED DESCRIPTION

Figure 1:
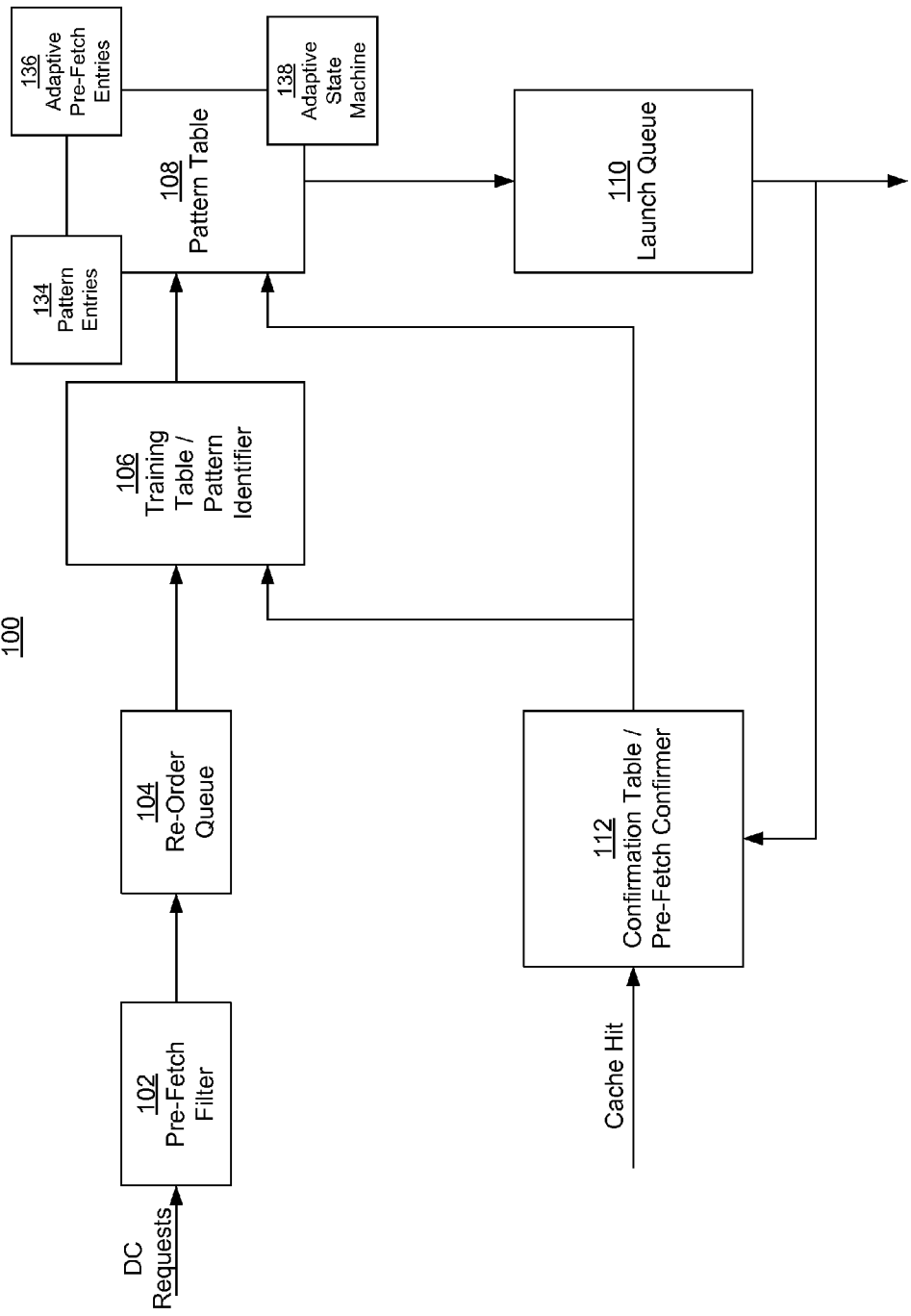
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

In various embodiments, a system (e.g., a processor, a system-on-a-chip, etc.) may include an execution unit configured to execute or process one or more instructions. In such an embodiment, these instructions may make up a program or application (or part thereof). In various embodiments, the execution unit may be included by a processor or other larger computer component. In various embodiments, these instructions may occasionally access (e.g., read from, write to, etc.) data stored in a memory system (e.g., L1 cache, L2 cache, and main memory, etc.).

In such an embodiment, when these instructions access data, they may first request the data from the L1 cache, as the first or fastest tier of the memory system. If the requested data is included in the cache (i.e. a cache hit), the L1 cache may supply the data (or update the stored data in the case of a write instruction), and the execution unit may proceed without incident.

However, in various embodiments, if the requested data is not included in the cache (i.e. a cache miss), the L1 cache may, in turn, request the data from the L2 cache (i.e. the next level or tier in the memory system). This may have a detrimental or undesired effect on the ability of the execution unit to proceed, and may cause the execution unit to delay or stall the processing of the instructions.

Traditionally, the L1 cache could only request one piece of data from the L2 cache at a time. However, in some embodiments, the system may include an L1 fill buffer configured to queue data requests to the L2 cache made by the L1 cache or on its behalf. In such an embodiment, the L1 cache may be able to accommodate additional requests for data from the execution unit, while awaiting the fulfillment of the data that caused the cache miss.

Likewise, the L2 cache may store a sub-set of data. If the cache-miss data is included in the cache, the data may be supplied to the L1 cache relatively forthwith. If not, another cache miss is generated, this time at the L2 cache level. The L2 cache may request the missing data from the main memory (or next tier in the memory system), and the main memory is expected to have the data in its stored data. In various embodiments, the main memory may only store a sub-set of data, and the entirety of possible data may be stored in a storage medium or other semi-permanent, or permanent memory device (e.g., hard drive, solid state device, optical disc, etc.). It is understood that the above are merely a few illustrative examples to which the disclosed subject matter is not limited.

Cache misses are generally considered undesirable. The system may include a pre-fetch unit configured to predict what data is likely to be requested by the instructions, and then cause that predicted data to be readily available in the memory system. In some embodiments, the pre-fetch unit may reduce the number of cache misses directly caused by the instructions. In such an embodiment, by requesting data before the instruction that needs (or is expected to need) the data is executed, a cache miss caused by requesting the data may be resolved by the time the instruction needs the data. In such an embodiment, the execution unit may not be aware that such a cache miss occurred, and may not stall or otherwise have its execution of the instructions adversely affected. It is understood that the above is merely one illustrative example to which the disclosed subject matter is not limited.

FIG. 1 is a block diagram of an example embodiment of a system, or pre-fetch unit or engine 100 in accordance with the disclosed subject matter. In the illustrated embodiment, a cursory overview of a possible pre-fetch unit or pre-fetcher is shown. Specifically, the illustrated pre-fetcher 100 may include a pre-fetch filter 102, a re-order queue 104, a pattern identifier or training table 106, a pattern table 108, a launch queue 110, and a pre-fetch confirmer or confirmation table 112. It is understood that the above is merely one illustrative example to which the disclosed subject matter is not limited.

In the illustrated embodiment, the data cache requests or demands may be input into the pre-fetch filter 102. In various embodiments, the pre-fetch filter 102 may be configured to track which data cache requests are associated with the same or a pre-encountered cacheline or memory address. In such an embodiment, the rest of the pre-fetcher 100 may deal with or experience only cachelines and not words or sub-portions of the same cacheline. It is understood that the above is merely one illustrative example to which the disclosed subject matter is not limited.

In the illustrated embodiment, a request for a given cacheline may be passed to the re-order queue 104. In various embodiments, the re-order queue 104 may be configured to re-order the data cache requests back to program order or the order the requests would naturally be issued by the program or stream of instructions. In various embodiments, the overall computing system or load-store unit may issue the data cache requests out of order (for various reasons), and the re-order queue 104 may be configured to reverse this alternation in the order of the requests.

In one embodiment, the cache pre-fetcher 100 may include a pattern identifier or training table 106 configured to detect a pattern of memory accesses that occur as a result of the instructions. For example, a series or stream of instructions may access memory addresses in a pattern of 3 kilobytes (KB), then 4 KB, then 4 KB (i.e., 3+4+4, etc.). In such an embodiment, the training table 106 may identify the pattern of memory access. It is understood that the above is merely one illustrative example to which the disclosed subject matter is not limited.

In various embodiments, the instructions may include a number of streams of instructions. In this context, a stream of instructions, or instruction stream may be a series of instructions all related to a common program, function, or subroutine, and executing in a sequence in order to accomplish a task. In modern computers, an execution unit may be configured to execute one or more streams of instructions substantially in parallel via techniques, such as, but not limited to multi-tasking, multi-threading, time slicing, etc. Likewise, the pre-fetch unit 100 may be configured to pre-fetch data for a variety of streams. Although, the disclosed subject matter is herein described in reference to a single stream, it is understood that the same process and data structures, etc. are being created, maintained and employed for the plurality of streams and the single instance described herein may be applied to all of the streams.

In such an embodiment, the pattern identifier 106 may be configured to detect memory access patterns within the various streams of instructions. In such an embodiment, a first stream of instructions may be associated with a first set of patterns of memory accesses (e.g., 3+4+4, 1+8+8, etc.) and a second stream of instructions may be associated with a second set of patterns of memory accesses (e.g., 3+5+4, 4+8+8, 3+4+4, etc.). In various embodiments, two or more streams of instructions may be associated with similar patterns. It is understood that the above are merely a few illustrative examples to which the disclosed subject matter is not limited.

In various embodiments, the pre-fetch unit 100 may include or maintain a pattern table 108 configured to store the detected or predicted memory access patterns. In various embodiments, the pattern table 108 may include a data structure stored within a memory included by the pre-fetch unit 100. In some embodiments, the pattern table structure 108 may not include a table but may include another form of data structure (e.g., linked list, array, etc.). It is understood that the above is merely one illustrative example to which the disclosed subject matter is not limited.

In various embodiments, the cache pre-fetcher 100 may be configured to base its pre-fetch data predictions upon, at least in part, the patterns stored in the pattern table 108. For example, if a 3+4+4 pattern is identified and a memory access to a memory address starting at a 3 KB boundary is detected, the cache pre-fetcher 100 may pre-fetch data at the next two 4 KB boundaries. It is understood that the above is merely one illustrative example to which the disclosed subject matter is not limited.

The pattern table 108 of the illustrated embodiment may include the traditional pattern entries 134 that correlate an instruction stream with a detected pattern. As described below in reference to FIGS. 2 and 3, the pattern table 108 of the illustrated embodiment may further include adaptive pre-fetch entries 136 that monitor and indicate the confidence level the pre-fetcher 100 has with the various identified patterns. In the illustrated embodiment, the pattern table 108 may also include an adaptive state machine 138 that is configured to dynamically adjust the confidence level the pre-fetcher 100 has in the various identified patterns. It is understood that the above is merely one illustrative example to which the disclosed subject matter is not limited.

The pre-fetch data requests generated in response to the identified patterns may be stored in the launch queue 110. In various embodiments, the launch queue 110 may be then dispatch these pre-fetch data requests to a fill buffer (e.g., the L2 fill buffer, etc.) or directly to a cache (e.g., the L2 cache, etc.).

In such an embodiment, the pre-fetch data requested by these pre-fetches may eventually be stored in the caches (e.g., L1 cache, L2 cache, etc.). In time, the instruction or program may actually request data (as opposed to speculatively pre-fetching it). If the pre-fetcher 100 correctly predicted the actual demand for data, when the actual data request or demand occurs it may result in a cache hit. Alternately, if the pre-fetcher 100 incorrectly predicted the actual demand for data, the actual data request or demand may result in a cache miss (as the actually requested data had not previously been pre-fetched and placed in the cache).

It is desirable to confirm that the predictions made by the cache pre-fetcher 100 are valid or at least useful. In various embodiments, such a feedback mechanism may be employed to improve the predictions made by the pre-fetch unit 100.

In various embodiments, the pre-fetch unit 100 may include a pre-fetch confirmer and/or confirmation table 112. In the illustrated embodiment, the pre-fetch confirmer 112 may be configured to monitor data accesses made by the instructions (or execution unit) and determine whether or not the cache pre-fetcher 100 correctly predicted that the instructions would access the pre-fetched data. In various embodiments, based upon this feedback (positive and/or negative) the pattern table 108 may adjust its prediction technique (as described in detail in reference to FIGS. 2 and 3). It is understood that the above are merely a few illustrative examples to which the disclosed subject matter is not limited.

In the illustrated embodiment, the pre-fetch confirmer 112 may be configured to receive a data access request (e.g., a load, a store, a read, a write, etc.) from the execution unit. In various embodiments, this data access request may be associated with the accessed data and may include a particular memory address where the accessed data is stored. In various embodiments, the data access request may also be received by the memory system and may be processed as described above in reference to the basic cache memory hierarchy description. In some embodiments, the pre-fetch confirmer 112 may receive a cache hit and/or miss from the memory system instead of a full data access request.

In various embodiments, the pre-fetch confirmer or confirmation table 112 may be configured to determine if the accessed data (or at least the memory address associated with it) have been pre-fetched or predicted by the pre-fetch unit 100. In one such embodiment, the pre-fetch confirmer 112 may be configured to inform the pattern identifier 106 and/or the pattern table 108 of the actual memory access (e.g., the memory address, if the access resulted in a cache hit and/or miss, if the accessed data was previously pre-fetched, etc.).

It is understood that the illustrated embodiment of FIG. 1 is merely one illustrative example to which the disclosed subject matter is not limited. A pre-fetcher 100 may be realized via a number of architectures or embodiments, and it is understood the one illustrated in FIG. 1 is merely an illustrative example and that other examples are possible. Further, it is also understood that those other examples or embodiments may include the adaptive state machine 138 and/or adaptive pre-fetch entries 136 shown by the disclosed subject matter.

Figure 2:
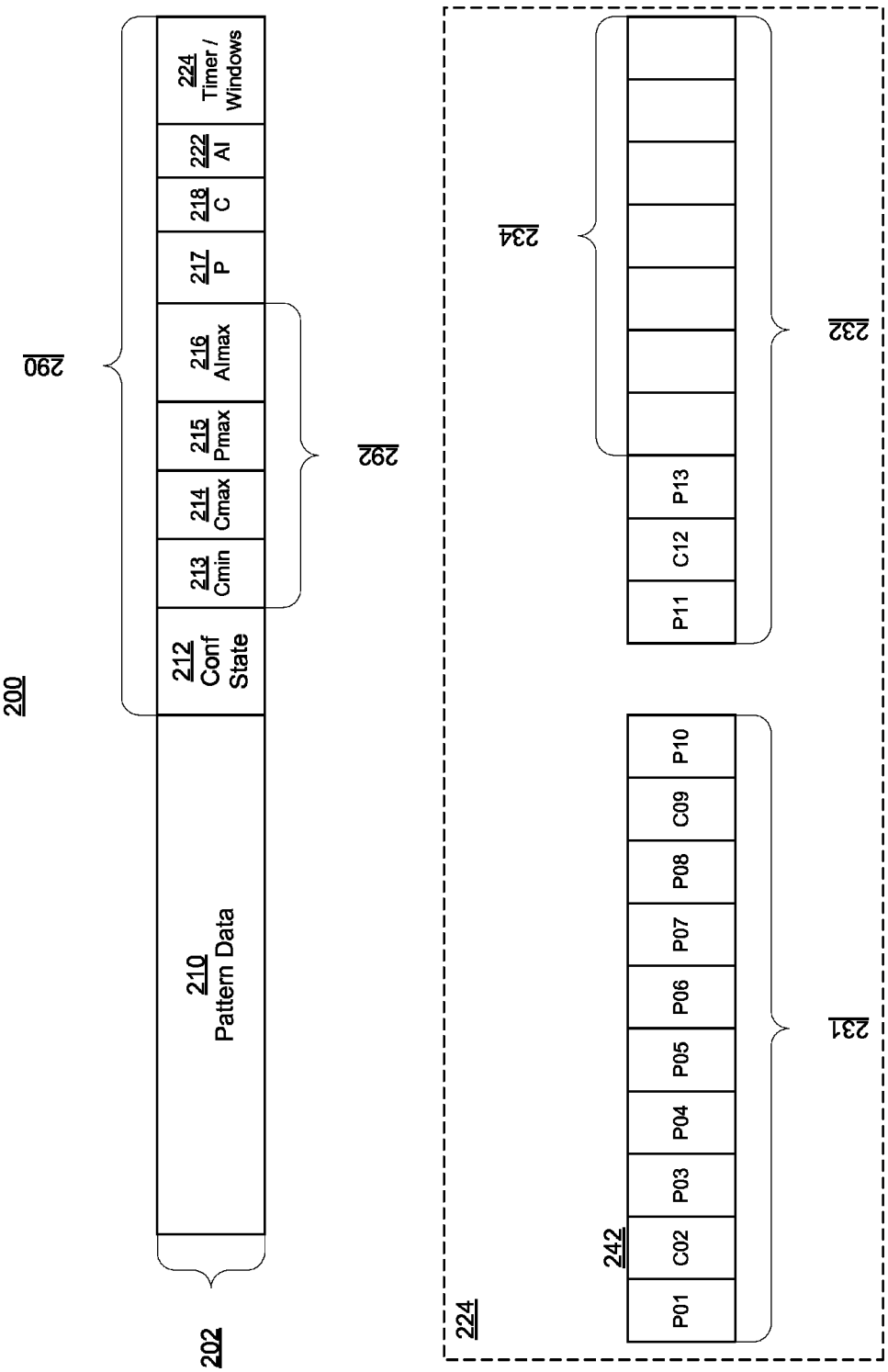
FIG. 2 is a block diagram of an example embodiment of data structures in accordance with the disclosed subject matter.
Figure 4:
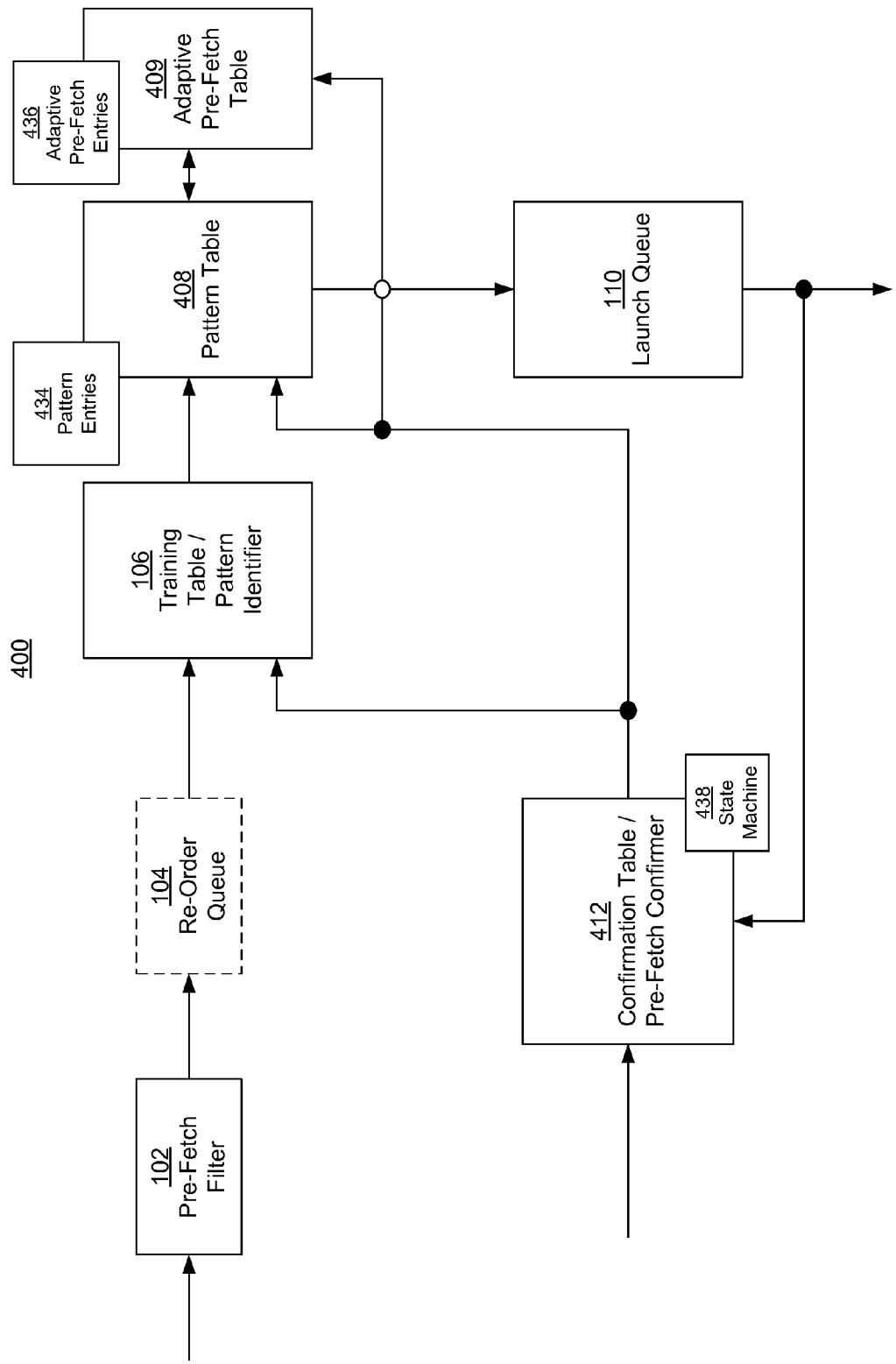
FIG. 4 is a block diagram of an example embodiment of a system in accordance with the disclosed subject matter.

FIG. 2 is a block diagram of an example embodiment of data structures 200 in accordance with the disclosed subject matter. Specifically, these data structures 202 and 224 may exist within a pattern table (e.g., as shown in FIG. 1) or separately in one or more other structures (e.g., as shown in FIG. 4). In such an embodiment, each instruction stream may be associated with similar data structures 200, and these data structures 200 may be employed to predict what data will be desired by the instruction stream.

As described above, the main purpose of a pre-fetch unit or engine is to reduce the effective latency experienced by various parts of a memory hierarchy. The pre-fetch engine speculatively requests data in the hope that when the data is actually requested by the instruction stream it will already be pre-loaded or pre-fetched into the appropriate caches and therefore the apparent latency (from the instruction stream's point-of-view) will be reduced (as compared to a cache miss).

In order to accomplish this, the pre-fetch unit desires to pre-fetch enough data or cachelines to remain well ahead of the instruction stream's current actual demand for data. This level or number of cachelines the pre-fetch unit is requesting ahead of the demand is referred to as the "degree" of the pre-fetch stream. Note, this should not be confused with the offset or address pattern used as part of the pattern in the pre-fetch engine, which tells the pre-fetch what memory address to request data from. The "degree" relates to how many pieces of the pre-fetched data are retrieved or stored at any one time, not where to get the data from (i.e. memory addresses).

However, a pre-fetch unit may also desire to avoid spurious pre-fetches that turn out to be unwanted (e.g., a speculative pre-fetch that is never actually accessed by the instruction stream). In various embodiments, this may occur, for example, due to the actual demand streams being very short in length (i.e., the instruction stream needs less data than the pre-fetch unit retrieved), or, potentially, inaccurate detection/prediction by the pre-fetch unit. It is understood that the above are merely a few illustrative examples to which the disclosed subject matter is not limited. Spurious or inaccurate pre-fetches waste resources, such as, for example, fill buffer space, consume bandwidth, consume power, and pollute caches with unneeded data, etc. It is understood that the above are merely a few illustrative examples to which the disclosed subject matter is not limited.

As briefly described above, in various embodiments, the pre-fetch unit may be configured to dynamically evaluate the accuracy of the previous pre-fetched data and increase or decrease the maximum amount of data that is allowably pre-fetched in excess of a respective data stream's current actual demand for data. In the illustrated embodiment, the data structures 200 may be employed to help the pre-fetch unit dynamically monitor the accuracy of the pre-fetches, evaluate the accuracy of the pre-fetches, and adjust the degree or the amount of data that is allowably pre-fetched. It is understood that the above is merely one illustrative example to which the disclosed subject matter is not limited.

In the illustrated embodiment, an entry 202 in the pattern table may exist. In various embodiments, this entry may include a traditional or conventional pattern data 210 that includes the identifier pattern (a 3+4+4 pattern) and associated instruction stream, etc. It is understood that the above is merely one illustrative example to which the disclosed subject matter is not limited. The details of the pattern data 210 are not the focus of the disclosed subject matter, but are shown to make clear that for each of a particular instruction stream, entry in the pattern table, or set of traditional pattern data 210, there is an associated set of the other data or confidence data 290.

In various embodiments, each pattern table entry may be assigned a given confidence level or state 212. This confidence state 212 indicates how much faith the pre-fetch engine has in this pattern entry, or how accurate the pre-fetches for the pattern entry have been. If the pre-fetches for the pattern entry have been more accurate, the confidence state may be higher. Conversely, if the pre-fetches for the pattern entry have been less accurate, the confidence state may be lower.

In the illustrated embodiment, the confidence state may dictate the degree or number of pre-fetches that may occur for the given pattern entry. If the confidence state is low, the number of allowable pre-fetches may be small. If the confidence state is high, the number of allowable pre-fetches may be large.

In the illustrated embodiment, the confidence state 212 may be associated with or include a number of parameters or settings values 292. In the illustrated embodiment, these parameters 292 are shown as being included within the pattern entry 202. In another embodiment, the parameters may be the same for all instances of a confidence state 212 (e.g., all pattern entries associated with a low level of confidence may have a P value of 5, etc.). In such an embodiment, the specific parameter values 292 may be stored elsewhere (e.g., in a common settings table, a confirmation state definition array, etc.) and not with each pattern entry 202 (as the confidence state 212 alone may be sufficient). However, the embodiment of FIG. 2 allows for a fuller explanation of the disclosed subject matter. It is understood that the above are merely a few illustrative examples to which the disclosed subject matter is not limited.

The parameters 292 associated with the confidence state will be better understood once the other values tracked by the disclosed subject matter are explained. As described above, the pre-fetch unit monitors and evaluates the accuracy of its pre-fetching predictions, and, in response, dynamically adjusts the number of pre-fetches that may occur for a given pattern entry. In order to accomplish this, in one embodiment, the pre-fetch unit may measure or count the number of speculative pre-fetches that are outstanding (not yet been matched to any actual data demands or requests), and those that have been closed (matched with an actual data demands or requests).

In such an embodiment, the pattern entry 202 may include a first field or value that may include a count (P 217) of allowable pre-fetches that have occurred but have not yet been matched to any actual data demands or requests (i.e., they are still speculative).

The pattern entry 202 may also include a second field or value that may include a count (C 218) of the pre-fetches that have occurred and have been matched to any actual data demands or requests (i.e., they are no longer speculative). In such an embodiment, as speculative pre-fetches are matched to actual data requests, the value of P 217 may decrease and the value of C 215 may increase. Likewise, as new speculative pre-fetches are made but not matched to actual data requests, the value of P 217 may increase and the value of C 215 may remain the same.

In various embodiments, the values of P 217 and C 218 may be periodically examined or evaluated to determine how accurate the predictions made by the pre-fetch unit are. In one embodiment, this period may be based upon a predefined amount of time. In another embodiment, this period may be based upon one or more events. In such an embodiment, a windowing mechanism may be employed as described in more detail in reference to the data structure 224. However, for now, the simpler time-based mechanism of will be discussed.

In such an embodiment, every predefined number of seconds, milliseconds, or clock cycles the pre-fetch engine may examine or evaluate the accuracy of its predictions by comparing P 217 and C 218. Based upon this evaluation, the pre-fetch engine may (or may not) change the confidence state 212 assigned to the pattern entry 202.

As described above, each confidence state 212 may be associated with one or more parameters 292. In various embodiments, a first parameter may include a minimum number of correct pre-fetches (Cmin 213) allowed before the confidence state 212 is degraded, reduced, or lowered. In a similar embodiment, a second parameter may include a maximum number of correct pre-fetches (Cmax 214) allowed before the confidence state 212 is upgraded, raised, or increased. In such an embodiment, during the evaluation phase (e.g., either caused by the expiration of a timer, or an event, such as, a condition associated with a window, etc.) the number of confirmed correct or no-longer speculative pre-fetches (C 218) may be determined and compared to Cmin 213 and Cmax 214. Based upon the comparison to these thresholds, the confidence state 212 may be lower, raised, or left untouched. As described below in reference to FIG. 3, if the confidence state 212 is adjusted or changed the parameters 292 may also be changed.

In various embodiments, each confidence state 212 may be associated a parameter that indicates a maximum number or degree (Pmax 215) of allowable pre-fetches that have occurred but have not yet been matched to any actual data demands or requests. As described above, as the confidence state 212 raises or lowers, the value of Pmax 215 may raise or lower. In such an embodiment, the value of Pmax 215 may limit the amount of pre-fetching that may be done for this particular pattern entry 202. As the pre-fetcher gains confidence in the pattern entry 202, more outstanding pre-fetches may be allowed. Conversely, as the pre-fetcher loses confidence in the pattern entry 202, fewer outstanding pre-fetches may be allowed. In such an embodiment, the Pmax 215 may serve as a threshold value limiting the amount of outstanding pre-fetching that may occur (as measured by P 217). As described below in reference to the data structure 224, the value for Pmax 215 may also influence the timing or occurrence of the periodic accuracy evaluation. It is understood that the above is merely one illustrative example to which the disclosed subject matter is not limited.

In various embodiments, after each evaluation phase, the values of P 217 and C 218 may be zeroed or reset to some value. In some embodiments, the pattern entry 202 may include a field or value that measures a level of accumulated inaccuracy (AI 222) of the pattern entry 202. In such an embodiment, before the values of P 217 and C 218 are reset (in preparation for the next monitoring period), the difference between P 217 and C 218 may be considered the number of pre-fetch inaccuracies that occurred during that monitoring period (in this simplified example). This number of inaccuracies that occurred during this given monitoring period may be added to a running total (AI 222) of all inaccuracies that have occurred during the lifetime of the pattern entry. In some embodiments, the AI 222 may count only the number of inaccuracies during a second time period (i.e., a time period different from the one used to measure C 218) or a sliding time window, and not during the full lifetime of the pattern entry 202. It is understood that the above is merely one illustrative example to which the disclosed subject matter is not limited.

In the illustrated embodiment, each confidence state 212 may be associated with a parameter (AImax 216) that indicates the maximum allowable number of inaccuracies that have accumulated during the lifetime of the pattern entry 202 (or second monitoring period of the embodiment). In a more preferred embodiment, the value of AImax 216 may be global or the same across all confidence states 212.

In various embodiments, once the AI 222 reaches or exceeds the threshold of AImax 216, the pre-fetch unit may take corrective action. In one embodiment, this may include killing or invalidating the pattern entry 202 and no longer performing pre-fetches based upon it. In such an embodiment, the pre-fetch unit may re-train based upon a new pattern (hopefully more accurately this time). In such an embodiment, a new pattern entry 202 may be employed for the newly identified a newly trained pattern.

In another embodiment, the corrective action may include a change in confidence state 212 (e.g., to a low confidence state, to a default confidence state, etc.). It is understood that the above are merely a few illustrative examples to which the disclosed subject matter is not limited.

In various embodiments, the pattern entry 202 may include a mechanism or field 224 that dictates when the evaluation phase or evaluation of P 217 and C 218 as to occur. In a less preferred embodiment, this field 224 may simply include a timer or other counter, as described above. In a more preferred embodiment, the field 224 may include a more complex data structure, such as, for example, one or more monitoring windows. In the illustrated embodiment, the data structure 224 may include two monitoring windows 231 and 232. It is understood that the above is merely one illustrative example to which the disclosed subject matter is not limited.

In various embodiments, the field 224 may not be included within the pattern entry 202 but merely associated with it. For example, in the illustrated embodiment, the data structure 224 may be sufficiently complex that it may be advantageous to store it separately or even in a different component of the pre-fetch unit (e.g., the confirmation table, etc.). It is understood that the above are merely a few illustrative examples to which the disclosed subject matter is not limited.

In the illustrated embodiment, the data structure 224 may include two monitoring windows 231 and 232. In various embodiments, the degree or Pmax 215 number may be employed to limit the number of pre-fetches and to determine when the evaluation phase (measuring P 217 and C 218) should occur.

In such an embodiment, a first window 231 may be defined. The window 231 may be large enough to store the maximum number of allowable outstanding (i.e., un-matched or still-speculative) pre-fetches (e.g., Pmax 215 or degree of the confidence state 212). As pre-fetch requests are made or completed, they (or their memory addresses, or a representation thereof) are stored within the window 231. These pre-fetches are stored in-order within the window 231.

In the illustrated embodiment, the window 231 has 10 slots or places to store pre-fetch information (i.e., Pmax 215 is equal to 10 in this example). As pre-fetches are made, they are stored in the various slots (e.g., P01, P02, P03, P04, P05, P06, P07, P08, P09, P10, etc.).

As actual data requests or demands are made, the confirmation unit may match these actual data demands against the pre-fetched data. In such an embodiment, the speculative or predicted pre-fetches may be marked or changed to confirmed pre-fetches or data.

For example, in the illustrated embodiment, if an actual data demand from the execution unit is made for the predicated or speculative data associated with the slot 242 or P02, the value of slot 242 may be changed from the value P02 to the value C02. In such an embodiment, this may indicate that there are only 9 outstanding pre-fetches (and P 217 may be changed from 10 to 9). In various embodiments, as more actual data demands are made more predictive or speculative slot values may change or flip from Ps (predicted) to Cs (confirmed). In various embodiments, this may involve the use of a flag bit. It is understood that the above is merely one illustrative example to which the disclosed subject matter is not limited.

In various embodiments, this form of monitoring may assume that the confirmations (or actual data demands) from a particular stream are arriving in program order. In various embodiments, this may not be an issue if the load-store unit operates in an in-order fashion. However, in embodiments that include out-of-order load-store units, a mechanism of re-ordering the demand loads and stores may be desired. In FIG. 1, this mechanism may be the re-order queue. It is understood that the above is merely one illustrative example to which the disclosed subject matter is not limited.

In the illustrated embodiment, as soon as the value of slot 242 has switched from P02 (predicted) to C02 (confirmed), the number of outstanding pre-fetches has dropped below the maximum allowable (Pmax 215) and more pre-fetches may be made. However, one may notice that the first window 231 has only 10 slots and they are all full. In such an embodiment, a double-buffering or multiple windowing scheme may be employed.

In the illustrated embodiment, a second window 232 may be created. Again, the second window 232 may include a number of slots equal to Pmax 215. As the first window 231 becomes full, new pre-fetches (if allowed under the Pmax cap or threshold) may be placed within the second window 232 (e.g., P11, etc.). In various embodiments, the second window 232 may normally include a number of empty slots 234 that have yet to be filled (as the Pmax limit may have been reached and no more pre-fetches may occur until a confirmation occurs).

As described above, the data structure 224 may be employed in an event-based evaluation or measurement scheme (as opposed to a timer or time based scheme, etc.). In such an embodiment, the evaluation phase may occur when one or more predefined events occur.

In one embodiment, a first event may include all predictive entries in the first window 231 turning into confirmed entries (e.g., P01, P02, . . . , P10 etc. turning to C01, C02, . . . , C10). In such an embodiment, the pre-fetcher may be considered to have 100% accuracy for that monitoring period.

In another embodiment, a second event may include a predictive entry in the second window 232 turning into a confirmed entry (e.g., P12 turning into C12, etc.). In embodiments in which confirmation occurs in programmatic order, skipping over a pre-fetch may mean that any skipped pre-fetches will never be confirmed. In the illustrated embodiment, the fact that P02 is confirmed as C02, means that entry P01 will never be confirmed and that the program has never and will never request that predicted data. P10, P13, etc. may be confirmed but the opportunity of confirm entry P01 has passed. Likewise, the confirmation of entry C09 indicates that entries P03, P04, P05, P06, P07, and P08 will no longer ever be confirmed. In such an embodiment, if an entry in the second window 232 is confirmed (e.g., P12 turning into C12, etc.), this means no un-confirmed entries in the first window 231 will ever be confirmed and the values of the first window 231 are now final. In such an embodiment, the use of the second window 232 may allow for the pre-fetcher to be tolerant of spurious of inaccurate pre-fetches (e.g., P01, etc.).

In various embodiments, other triggering events may occur or be employed to trigger the evaluation phase. It is understood that the above are merely a few illustrative examples to which the disclosed subject matter is not limited.

As described above, once the evaluation phase occurs the value of C 218 may be computed. In some embodiments, the value of C 218 may have been updated in real-time as various pre-fetch confirmations occurred. In another embodiment, the value of C 218 may only be updated during the evaluation phase. In various embodiments, only the values from the first window 231 may be included in the computation of C 218.

For example, in the illustrated embodiment, the confirmation of C12 may have triggered the evaluation phase. In such an embodiment, as the only confirmations within the first window 231 are C02 and C09, the value of C 218 would be 2 (not 3, as C12 is not counted at this time).

Likewise, the number of inaccuracies for this monitoring period or window may be the number of the outstanding or un-confirmed predicted entries in the first window 231 (8; P01, P03, P04, P05, P06, P07, P08, and P10). Note, this differs from the simple explanation of inaccuracies and AI 222 that was discussed above and based upon a time period as opposed to a window or event-based monitoring scheme. This number of inaccuracies may be added to the aggregate number of inaccuracies, AI 222.

Further, it is noted that the value P 217 in an event-based scheme may include the total number of outstanding pre-fetches across all or both windows 231 and 232, and not simply a single window. As described above as part of the explanation of the simplified timer or time period scheme, the values P 217 and C 218 were discussed as being somewhat complementary. This may not be the case with an event-based scheme when the values P 217 and C 218 are measured over different windows (e.g., P 217 across all windows, C 218 across a first window, etc.). It is understood that the above are merely a few illustrative examples to which the disclosed subject matter is not limited.

As described above, during the evaluation phase, the value of C 218 may be compared to the parameters Cmin 213 and Cmax 214 and the confidence state 212 may be adjusted. Also described above, a change in the confidence state 212 may result in a change in the parameter Pmax 215. In the illustrated embodiment, as the size of the windows 231 and 232 are based upon Pmax 215, this may result in a change in the size of the windows 231 and 232, as described below.

At the end of the evaluation phase, the first window 231 may be deleted, as all information from it may have been gleaned. The second window 232 may then be considered the first window 231, and a new second window 232 may be created when needed. In some embodiments, this may be implemented by deleting the contents of the first window 231 and copying or moving the contents (e.g., P11, C12, P13, etc.) of the second window 232 into the first window 231. In another embodiment, a pointer or toggle flag may be employed to identify which of the two windows 231 and 232 are considered the first or second window and this pointer or toggle flag may be flipped or swapped each monitoring period. It is understood that the above are merely a few illustrative examples to which the disclosed subject matter is not limited.

Further, as the size of the windows 231 and 232 are dependent upon the parameter Pmax 215, during the moving of the windows, the windows may also be resized. For example, if Pmax was lowered from 10 to 5, the first window 231 may be resized to only include 5 slots (of which three would be filled with P11, C12, and P13), and likewise with the new second window 232. In some embodiments, if the number of existing outstanding or confirmed pre-fetches exceeds the new size of the first window 231, the excess existing outstanding or confirmed pre-fetches may be placed within the new second window 232. For example, if the new Pmax is 5, but the entries P11, C12, P13, P14, P15, and P16 already exist, P11, C12, P13, P14, and P15 may be placed within the first window 231 and P16 may be placed within the new second window 232. It is understood that the above is merely one illustrative example to which the disclosed subject matter is not limited. Likewise, if Pmax 215 is increased, the size of the windows 231 and 232 may be increased.

At the end of the evaluation phase, the value of P 217 may be updated to reflect the outstanding pre-fetches now that the original first window 231 has been deleted. For example, in the illustrated embodiment, prior to the evaluation phase, the value of P 217 may have been 10 (due to P01, P03, P04, P05, P06, P07, P08, P10, P11, and P13). But, after the first window 231 has been deleted and the contents of the second window 232 moved to the new first window 231, the value of P 217 may be 2 (due to P11 and P13). It is understood that the above is merely one illustrative example to which the disclosed subject matter is not limited. Likewise, the value of C 218 may be altered, depending upon the embodiment.

Figure 3:
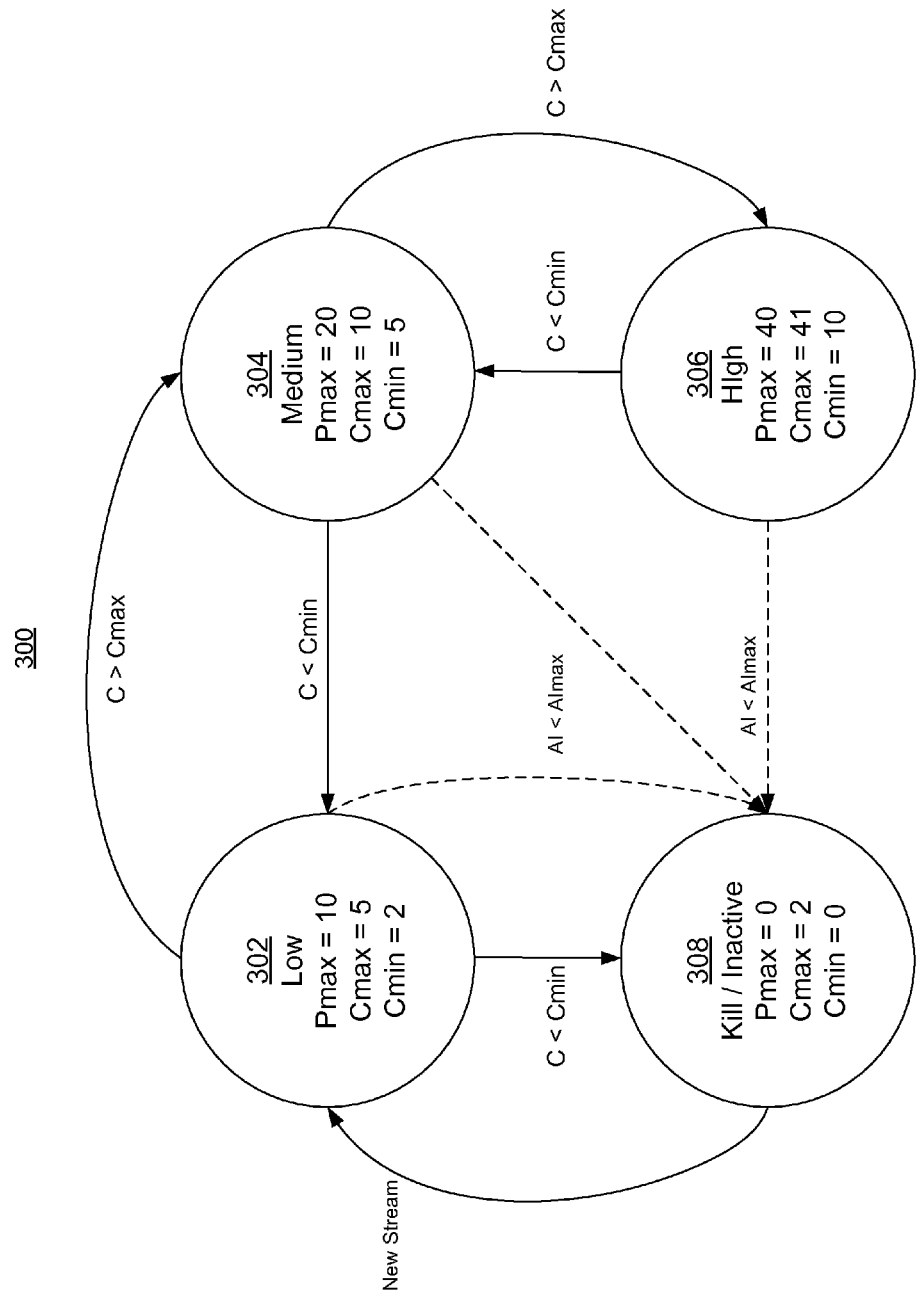
FIG. 3 is a block diagram of an example embodiment of a state machine in accordance with the disclosed subject matter.

FIG. 3 is a block diagram of an example embodiment of a state machine 300 in accordance with the disclosed subject matter. It is understood that the state machine 300 is merely one illustrative example to which the disclosed subject matter is not limited. In various embodiments, a state machine of any number of states may exist. Further, in some embodiments, a technique (e.g., a graph, etc.) may be employed to compute states and parameters without the use of a traditional state machine. It is understood that the above are merely a few illustrative examples to which the disclosed subject matter is not limited.

In the illustrated embodiment, the state machine 300 may include four confidence states or levels: low 302, medium 304, high 306, and kill 308. As described above, each of these states may be associated with their own respective parameters (Pmax, Cmax, Cmin, etc.).

For example, in the illustrated embodiment, the low confidence state 302 may include or be associated with a Pmax or degree of 10, a Cmax of 5, and a Cmin of 2. The medium confidence state 304 may include or be associated with a Pmax or degree of 20, a Cmax of 10, and a Cmin of 5. The high confidence state 306 may include or be associated with a Pmax or degree of 40, a Cmax of 41, and a Cmin of 10. The kill or inactive confidence state 308 may include or be associated with a Pmax or degree of 0, a Cmax of 2, and a Cmin of 0. It is understood that the above are merely a few illustrative examples to which the disclosed subject matter is not limited.

In the illustrated embodiment, if a stream or pattern entry is inactive it may wait or default to the inactive state 308. As the Pmax for this state is 0 no pre-fetches may occur. In various embodiments, once a new stream is encountered or a new pattern entry is created, it may be assigned a low confidence state 302 (or other state based upon the embodiment), and pre-fetches may occur as described above.

In the illustrated embodiment, as the value of C is greater than or less than the respective values Cmax or Cmin, the state of the pattern entry may increase or decrease. As confidence improves, the confidence state may change from low 302 to medium 304 and ultimately to high 306. In the illustrated embodiment, the Cmax of the high state 306 may be set high enough that it may not be exceeded (e.g., Cmax may equal 41 when Pmax is only 40), thus terminating the climb towards greater confidence. Conversely, as confidence declines, the confidence state may change from high 306, to medium 304, to low 302 and ultimately to kill or inactive 308. In various embodiments, once the pattern entry 308 has entered the kill state 308 the pattern entry may be removed from the pattern table and the pre-fetch engine may re-train based upon a new pattern. It is understood that the above are merely a few illustrative examples to which the disclosed subject matter is not limited.

In the illustrated embodiment, if the number of aggregate inaccuracies (AI) ever exceeds a threshold value (AImax) the pattern entry may be killed or rendered inactive (via the kill state 308). In the illustrated embodiment, this may occur directly from any other state, as opposed to the ordered or sequential raising or lowering of confidence that may occur via the confirmed pre-fetch comparison (C vs Cmax/Cmin).

In a less preferred embodiment, the value AImax may be based upon the respective confidence state as opposed to being a global count value. In such an embodiment, the AI may result in a more ordered lowering of the confidence state, unlike that shown in the illustrated embodiment. It is understood that the above is merely one illustrative example to which the disclosed subject matter is not limited.

In various embodiments, the disclosed subject matter may improve the performance of the pre-fetch engine or unit due, in part, to the larger degree or depth for accurate pre-fetch streams. That is, the disclosed subject matter allows for more pre-fetches to occur as the confidence in the accuracy of the pre-fetches increases. Likewise, as confidence decreases, less pre-fetches occur meaning that less inaccurate pre-fetches are likely to occur. In such an embodiment, a reduction in the number of spurious or inaccurate pre-fetches may mean less power consumed.

Further, the disclosed subject matter allows for a superior and more accurate evaluation of the pre-fetch stream's accuracy. As described above, a window or event-based approach to measuring the accuracy of the pre-fetches may lead to a more precise evaluation of the pre-fetch's accuracy than a simplified time-based approach. Further, in such an embodiment, an event-based approach may be more tolerant of spurious pre-fetches. Conversely, the ability to kill stream or delete pattern entries that are deemed to have generated too many cumulative or aggregate inaccurate pre-fetches may improve overall system performance.

As described above, the ability of the disclosed subject matter to dynamically adjust or ramp the degree at which pre-fetching occurs may improve the performance of the pre-fetch engine or unit. Further, in various embodiments, the speed at which the degree is adjusted or ramped up or down may be controlled via the various parameters (e.g., Cmax, Cmin, etc.) associated with the confidence states. It is understood that the above are merely a few illustrative examples to which the disclosed subject matter is not limited.

FIG. 4 is a block diagram of an example embodiment of a system or pre-fetcher 400 in accordance with the disclosed subject matter. Like the system 100 of FIG. 1, it is understood that the pre-fetcher 400 is merely one illustrative example to which the disclosed subject matter is not limited. However, the pre-fetcher 400 is used to illustrate two variations of the disclosed subject matter that may not be readily apparent if only FIG. 1 is shown.

As described above, the pre-fetcher 400 may include a pre-fetch filter 102, a training table or pattern identifier 106, a pattern table 408 with pattern entries 434, an adaptive pre-fetch table 409, a launch queue 110, and a confirmation table or pre-fetch confirmer 412. These components may be similar or analogous to those described above in reference to FIG. 1.

The first illustrated difference between that of FIG. 1 and this embodiment is that the re-order queue 104 is shown as being optional. As described above, in some embodiments, the windowing scheme may rely upon in-order tracking of actual data demands or requests, but that the load-store unit of the greater system or processor may issue these out-of-order, and that the re-order queue 104 (or similar in the pre-fetch confirmer 112) may place these actual data demands back in programmatic order.

In the illustrated embodiment, a monitoring scheme may be employed that does not rely upon the in-order tracking of the actual data demands, and therefore the re-order queue 104 may be removed or not included. It is understood that the above is merely one illustrative example to which the disclosed subject matter is not limited.

The second illustrated difference may be that the adaptive pre-fetch table 409 is separate from the pattern table 408. In the illustrated embodiment, the adaptive pre-fetch table 409 may include the adaptive pre-fetch entries 436. These entries may include the fields or values 290 of FIG. 2 or a similar embodiment. The pattern entries 434 (shown as pattern data 210 of FIG. 2) may continue to be included in the pattern table 434. In such an embodiment, the adaptive pre-fetch entries 436 may continue to be associated with their respective pattern entries 434, but may be stored in a physically separate location or data structure. It is understood that the above is merely one illustrative example to which the disclosed subject matter is not limited.

Further, in the illustrated embodiment, the state machine 438 may be included in the pre-fetch confirmer 412 or similarly separate data structure. In such an embodiment, the circuit or logic that monitors and/or evaluates the accuracy of the pre-fetches may be included within the pre-fetch confirmer 412, and the data structures 436 may be included in the table 409.

In various embodiments, as described above, the state machine 438 may include the global parameters for each state (e.g., Pmax, Cmax, Cmin, etc.) and these values may not be stored within the adaptive pre-fetch entries 436. In such an embodiment, the confidence state value may be stored within the adaptive pre-fetch entries 436 and then referenced from the state machine 438. It is understood that the above are merely a few illustrative examples to which the disclosed subject matter is not limited.

FIG. 5 is a flow chart of an example embodiment of a technique in accordance with the disclosed subject matter. In various embodiments, the technique 500 may be used or produced by the systems such as those of FIG. 1, 4, or 6. Furthermore, portions of technique 500 may make use of or produce by data structures such as that of FIGS. 2 and/or 3. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a plurality of pre-fetch cache requests associated with a data stream may be monitored, as described above. In various embodiments, monitoring may include tracking pre-fetch cache requests via at least two windows of pre-fetch requests, as described above. In such an embodiment, each window may comprise a window size equal to a degree associated with the maximum amount of data that is allowably pre-fetched in excess of the data stream's current actual demand for data, as described above. In one such embodiment, monitoring may include as the data stream makes an actual demand for data, determining if the actual demand for data matches a pre-fetch cache request within one of the at least two windows of pre-fetch requests, as described above. It is understood that the above are merely a few illustrative examples to which the disclosed subject matter is not limited.

Block 504 illustrates that, in one embodiment, the accuracy of the pre-fetch cache requests may be evaluated, as described above. In one embodiment, evaluating may include evaluating the accuracy of the pre-fetch cache requests associated with a first window of the at least two windows of pre-fetch requests, when either the actual demand for data matches a pre-fetch cache request within a second window of the at least two windows of pre-fetch requests, or all of the pre-fetch cache request within the first window matches actual demands for data, as described above. In some embodiments, evaluating may include an event-based approach to evaluating the accuracy of the pre-fetch cache requests, as described above. It is understood that the above are merely a few illustrative examples to which the disclosed subject matter is not limited.

Block 506 illustrates that, in one embodiment, based at least in part upon the accuracy of the pre-fetch cache requests, a maximum amount of data that is allowably pre-fetched in excess of a data stream's current actual demand for data may be adjusted, as described above. In one such embodiment, adjusting may include moving a content of the second window into the first window, such that the second window is no longer associated with any pre-fetch cache requests, as described above. Further, adjusting may include determining a new maximum amount of data that is allowably pre-fetched in excess of the data stream's current actual demand for data, as described above. Also, in such an embodiment, adjusting may include resizing the window sizes of the at least two windows of pre-fetch requests to the new maximum amount of data that is allowably pre-fetched in excess of the data stream's current actual demand for data, as described above.

In another embodiment, adjusting may include, if the accuracy of the pre-fetch cache requests is below a predefined threshold value, reducing the maximum amount of data that is allowably pre-fetched in excess of the data stream's current actual demand for data, as described above. Conversely adjusting may include, if the accuracy of the pre-fetch cache requests is above a predefined threshold value, increasing the maximum amount of data that is allowably pre-fetched in excess of the data stream's current actual demand for data, as described above. Otherwise, adjusting may include not adjusting a maximum amount of data that is allowably pre-fetched in excess of the data stream's current actual demand for data, as described above.

In yet another embodiment, adjusting may include, if an aggregate inaccuracy of the pre-fetch cache requests associated with the data stream exceeds a predefined threshold value, ceasing pre-fetching data for the data stream, as described above.

In one embodiment, adjusting may include dynamically adjusting a confidence state associated with the data stream, as described above. In such an embodiment, adjusting a confidence state may include associating the data stream with one of a plurality of predefined confidence states. In such an embodiment, each confidence state may be associated with a minimum level of accuracy of the pre-fetch cache requests, a maximum level of accuracy of the pre-fetch cache requests, and a maximum amount of data that is allowably pre-fetched in excess of the data stream's current actual demand for data, as described above. It is understood that the above are merely a few illustrative examples to which the disclosed subject matter is not limited.

Figure 6:
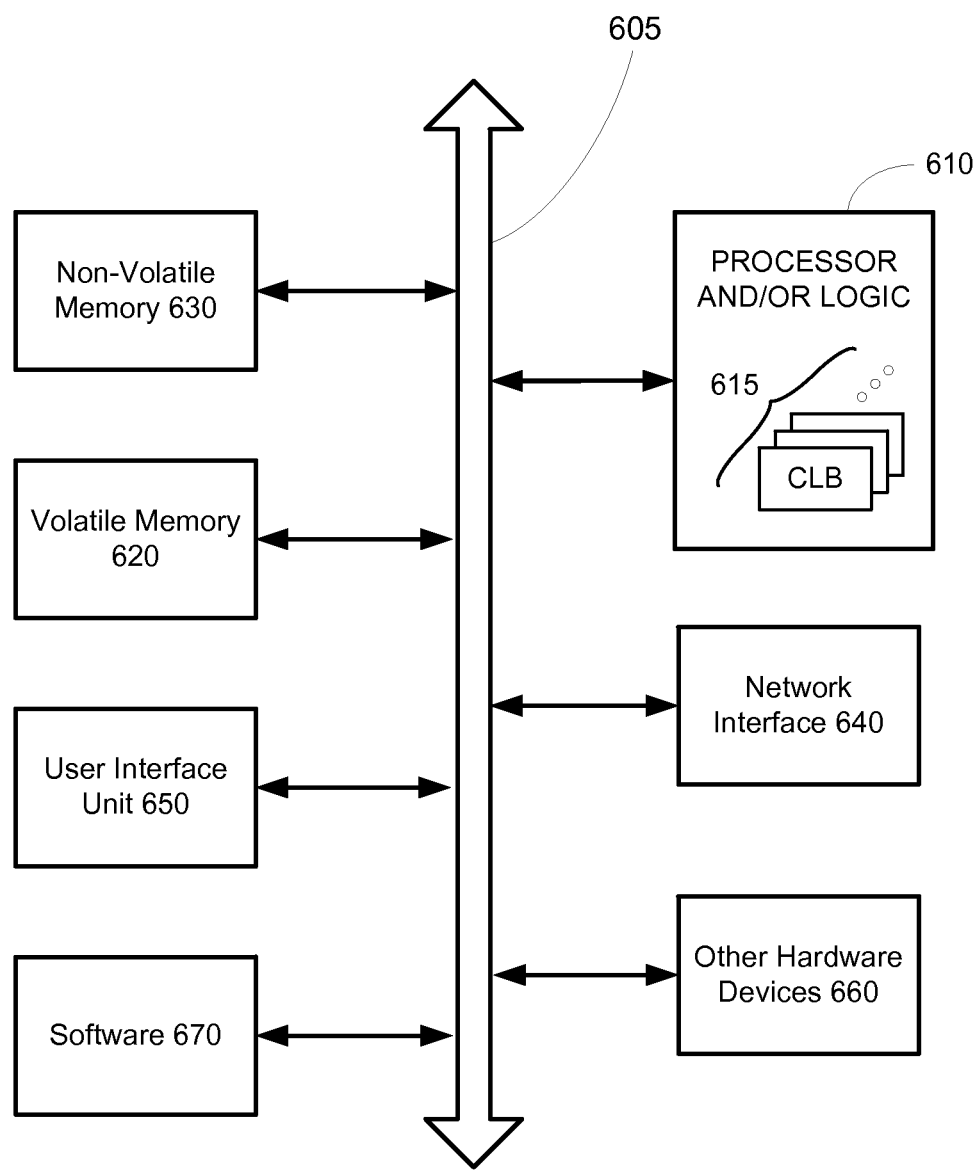
FIG. 6 is a schematic block diagram of an information processing system that may include devices formed according to principles of the disclosed subject matter.

FIG. 6 is a schematic block diagram of an information processing system 600, which may include semiconductor devices formed according to principles of the disclosed subject matter.

Referring to FIG. 6, an information processing system 600 may include one or more of devices constructed according to the principles of the disclosed subject matter. In another embodiment, the information processing system 600 may employ or execute one or more techniques according to the principles of the disclosed subject matter.

In various embodiments, the information processing system 600 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 600 may be used by a user (not shown).

The information processing system 600 according to the disclosed subject matter may further include a central processing unit (CPU), logic, or processor 610. In some embodiments, the processor 610 may include one or more functional unit blocks (FUBs) or combinational logic blocks (CLBs) 615. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 600 according to the disclosed subject matter may further include a volatile memory 620 (e.g., a Random Access Memory (RAM), etc.). The information processing system 600 according to the disclosed subject matter may further include a non-volatile memory 630 (e.g., a hard drive, an optical memory, a NAND or Flash memory, etc.). In some embodiments, either the volatile memory 620, the non-volatile memory 630, or a combination or portions thereof may be referred to as a "storage medium". In various embodiments, the volatile memory 620 and/or the non-volatile memory 630 may be configured to store data in a semi-permanent or substantially permanent form.

In various embodiments, the information processing system 600 may include one or more network interfaces 640 configured to allow the information processing system 600 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 600 according to the disclosed subject matter may further include a user interface unit 650 (e.g., a display adapter, a haptic interface, a human interface device, etc.). In various embodiments, this user interface unit 650 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 600 may include one or more other devices or hardware components 660 (e.g., a display or monitor, a keyboard, a mouse, a camera, a fingerprint reader, a video processor, etc.). It is understood that the above are merely a few illustrative examples to which the disclosed subject matter is not limited.

The information processing system 600 according to the disclosed subject matter may further include one or more system buses 605. In such an embodiment, the system bus 605 may be configured to communicatively couple the processor 610, the volatile memory 620, the non-volatile memory 630, the network interface 640, the user interface unit 650, and one or more hardware components 660. Data processed by the processor 610 or data inputted from outside of the non-volatile memory 630 may be stored in either the non-volatile memory 630 or the volatile memory 620.

In various embodiments, the information processing system 600 may include or execute one or more software components 670. In some embodiments, the software components 670 may include an operating system (OS) and/or an application. In some embodiments, the OS may be configured to provide one or more services to an application and manage or act as an intermediary between the application and the various hardware components (e.g., the processor 610, a network interface 640, etc.) of the information processing system 600. In such an embodiment, the information processing system 600 may include one or more native applications, which may be installed locally (e.g., within the non-volatile memory 630, etc.) and configured to be executed directly by the processor 610 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 610.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SS OP) technique, a thin small outline package (TS OP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts is to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A method comprising:
    monitoring a plurality of pre-fetch cache requests associated with a data stream;
    evaluating an accuracy of the pre-fetch cache requests; and
    based at least in part upon the accuracy of the pre-fetch cache requests, adjusting a maximum amount of data that is allowably pre-fetched in excess of a data stream's current actual demand for data; and
    wherein monitoring comprises:
  tracking pre-fetch cache requests via at least two windows of pre-fetch requests, wherein each window comprise a window size equal to a degree associated with the maximum amount of data that is allowably pre-fetched in excess of the data stream's current actual demand for data.

2. The method of claim 1, wherein monitoring comprises:
as the data stream makes an actual demand for data, determining if the actual demand for data matches a pre-fetch cache request within one of the at least two windows of pre-fetch requests; and
wherein evaluating comprises:
evaluating the accuracy of the pre-fetch cache requests associated with a first window of the at least two windows of pre-fetch requests, when either the actual demand for data matches a pre-fetch cache request within a second window of the at least two windows of pre-fetch requests, or all of the pre-fetch cache request within the first window matches actual demands for data.

3. The method of claim 2, wherein adjusting comprises:
moving a content of the second window into the first window, such that the second window is no longer associated with any pre-fetch cache requests;
determining a new maximum amount of data that is allowably pre-fetched in excess of the data stream's current actual demand for data; and
resizing the window sizes of the at least two windows of pre-fetch requests to the new maximum amount of data that is allowably pre-fetched in excess of the data stream's current actual demand for data.

4. The method of claim 1, wherein adjusting comprises:
if the accuracy of the pre-fetch cache requests is below a predefined threshold value, reducing the maximum amount of data that is allowably pre-fetched in excess of the data stream's current actual demand for data,
if the accuracy of the pre-fetch cache requests is above a predefined threshold value, increasing the maximum amount of data that is allowably pre-fetched in excess of the data stream's current actual demand for data, and
otherwise, not adjusting a maximum amount of data that is allowably pre-fetched in excess of the data stream's current actual demand for data.

5. The method of claim 1, wherein adjusting comprises:
if an aggregate inaccuracy of the pre-fetch cache requests associated with the data stream exceeds a predefined threshold value, ceasing pre-fetching data for the data stream.

6. The method of claim 1, wherein adjusting comprises:
dynamically adjusting a confidence state associated with the data stream.

7. The method of claim 6, wherein adjusting a confidence state comprises associating the data stream with one of a plurality of predefined confidence states; and
wherein each confidence state is associated with a minimum level of accuracy of the pre-fetch cache requests, a maximum level of accuracy of the pre-fetch cache requests, and a maximum amount of data that is allowably pre-fetched in excess of the data stream's current actual demand for data.

8. The method of claim 1, wherein evaluating an accuracy of the pre-fetch cache requests comprises an event-based approach to evaluating the accuracy of the pre-fetch cache requests.

9. An apparatus comprising:
a pre-fetch confirmer configured to:
monitor a plurality of pre-fetch cache requests associated with a data stream,
evaluate an accuracy of the pre-fetch cache requests, and
based at least in part upon the accuracy of the pre-fetch cache requests, adjust a maximum amount of data that is allowably pre-fetched in excess of a data stream's current actual demand for data; and
a memory configured to:
store a first data structure indicating the accuracy of the plurality of pre-fetch cache requests, and
store a second data structure indicating the maximum amount of data that is allowed to be pre-fetched in excess of a data stream's current actual demand for data; and
wherein the first data structure comprises:
at least two windows of pre-fetch requests, wherein each window comprises a data structure having a window size equal to a degree associated with the maximum amount of data that is allowably pre-fetched in excess of the data stream's current actual demand for data.

10. The apparatus of claim 9, wherein the pre-fetch confirmer is configured to:
as the data stream makes an actual demand for data, determine if the actual demand for data matches a pre-fetch cache request represented within the at least two windows of pre-fetch requests; and
evaluate the accuracy of the pre-fetch cache requests associated with a first window of the at least two windows of pre-fetch requests, when either the actual demand for data matches a pre-fetch cache request within a second window of the at least two windows of pre-fetch requests, or all of the pre-fetch cache request within the first window matches respective actual demands for data.

11. The apparatus of claim 10, wherein the memory is configured to:
move a content of the second window into the first window, such that the second window is no longer associated with any pre-fetch cache requests;
determine a new maximum amount of data that is allowably pre-fetched in excess of the data stream's current actual demand for data; and
resize the window sizes of the at least two windows of pre-fetch requests to the new maximum amount of data that is allowably pre-fetched in excess of the data stream's current actual demand for data.

12. The apparatus of claim 9, wherein the pre-fetch confirmer is configured to:
if the accuracy of the pre-fetch cache requests is below a predefined threshold value, reduce the maximum amount of data that is allowably pre-fetched in excess of the data stream's current actual demand for data,
if the accuracy of the pre-fetch cache requests is above a predefined threshold value, increase the maximum amount of data that is allowably pre-fetched in excess of the data stream's current actual demand for data, and
otherwise, not adjust a maximum amount of data that is allowably pre-fetched in excess of the data stream's current actual demand for data.

13. The apparatus of claim 9, wherein the pre-fetch confirmer is configured to:
if an aggregate inaccuracy of the pre-fetch cache requests associated with the data stream exceeds a predefined threshold value, instructing a pre-fetch unit to cease pre-fetching data for the data stream.

14. The apparatus of claim 9, wherein the maximum amount of data that is allowed to be pre-fetched in excess of a data stream's current actual demand for data is indicated by a confidence state; and wherein the pre-fetch confirmer is configured to:
adjust the confidence state associated with the data stream.

15. The apparatus of claim 14, wherein the pre-fetch confirmer is configured to associate the data stream with one of a plurality of predefined confidence states; and
wherein each confidence state is associated with a minimum level of accuracy of the pre-fetch cache requests, a maximum level of accuracy of the pre-fetch cache requests, and a maximum amount of data that is allowably pre-fetched in excess of the data stream's current actual demand for data.

16. A pre-fetch unit comprising:
a pattern table comprising a pattern data structure associated with a data stream;
an adaptive pre-fetch table comprising an adaptive pre-fetch data structure associated with the data stream and indicating a maximum amount of data that is allowably pre-fetched in excess of a data stream's current actual demand for data; and
a launch queue configured to issue a plurality of pre-fetch cache requests to pre-fetch data for the data stream; and
wherein the pre-fetch unit is configured to:
evaluate an accuracy of the pre-fetch cache requests, and
based at least in part upon the accuracy of the pre-fetch cache requests, adjust the maximum amount of data that is allowably pre-fetched in excess of a data stream's current actual demand for data; and
wherein the adaptive pre-fetch table comprises at least two windows of pre-fetch requests,
wherein each window comprises a data structure having a window size equal to a degree associated with the maximum amount of data that is allowably pre-fetched in excess of the data stream's current actual demand for data; and
wherein the pre-fetch unit is configured to:
as the data stream makes an actual demand for data, determine if the actual demand for data matches a pre-fetch cache request represented within the at least two windows of pre-fetch requests; and
when triggered by an predefined event, evaluate the accuracy of the pre-fetch cache requests associated with a first window of the at least two windows of pre-fetch requests.

17. The pre-fetch unit of claim 16, wherein the pre-fetch unit is configured to:
associate the data stream with one of a plurality of predefined confidence states, and in response to a triggering event, associate the data stream with another one of a plurality of predefined confidence states; and
wherein each confidence state is associated with:
a minimum level of accuracy of the pre-fetch cache requests,
a maximum level of accuracy of the pre-fetch cache requests, and
a maximum amount of data that is allowed to be pre-fetched in excess of the data stream's current actual demand for data.

* * * * *